United States Patent
Tschudin

[11] Patent Number: 5,573,451
[45] Date of Patent: Nov. 12, 1996

[54] CYLINDRICAL GRINDING MACHINE

[76] Inventor: Urs Tschudin, Bachtelenstrasse 79, 2540 Grenchen, Switzerland

[21] Appl. No.: 258,980

[22] Filed: Jun. 13, 1994

[30] Foreign Application Priority Data

Jun. 28, 1993 [CH] Switzerland .................. 1923/93

[51] Int. Cl.⁶ ............................................ B24B 5/00
[52] U.S. Cl. ........................................ 451/243; 451/242
[58] Field of Search ............................ 451/242, 243, 451/246, 120, 123, 124, 140, 143, 150, 151, 178, 11, 24, 25, 26

[56] References Cited

U.S. PATENT DOCUMENTS

| | | | |
|---|---|---|---|
| 2,277,028 | 3/1942 | Widener et al. | 451/243 |
| 2,793,479 | 12/1957 | Arms et al. | 451/25 |
| 2,909,009 | 7/1959 | Schmidt et al. | 451/25 |
| 3,805,456 | 4/1974 | Williams . | |
| 4,003,166 | 1/1977 | Kawamura . | |
| 4,009,538 | 3/1977 | Hanecker | 451/243 |
| 4,417,422 | 11/1983 | Redeker et al. | 451/143 |
| 4,443,975 | 4/1984 | German . | |
| 4,497,138 | 2/1985 | Schreiber . | |
| 4,570,387 | 2/1986 | Unno et al. | 451/242 |
| 4,783,932 | 11/1988 | Sager | 451/242 |
| 4,831,783 | 5/1989 | Frohn . | |

FOREIGN PATENT DOCUMENTS

| | | | |
|---|---|---|---|
| 0260180 | 3/1988 | European Pat. Off. | B23Q 1/02 |
| 3925908 | 2/1991 | Germany | B24B 41/02 |
| 1149199 | 4/1969 | United Kingdom | B24B 5/00 |

*Primary Examiner*—D. S. Meislin
*Assistant Examiner*—Derris H. Banks
*Attorney, Agent, or Firm*—Cushman Darby & Cushman, L.L.P.

[57] ABSTRACT

A cylindrical grinding machine has a machine base, a driven workhead with a slide drive and a driven wheelhead with a slide drive. The machine base is formed as a fixed plate, which can be aligned horizontally or vertically. A tailstock has a slide drive which is controllable independently of the other slide drives.

12 Claims, 5 Drawing Sheets

CYLINDRICAL GRINDING MACHINE

BACKGROUND OF THE INVENTION

1. Field of the Invention

The invention relates to a cylindrical grinding machine, having a machine base, a driven workhead to turn a workpiece about a rotation axis, a driven wheelhead to grind the workpiece and a slide drive for relative movement of the workpiece and the wheelhead, wherein the machine base is formed as a fixed plate, on which the workhead, the wheelhead and the slide drive are fixedly attached.

2. Description of Related Art

Cylindrical grinding machine is known from the US-A-4 443 975. The disclosed cylindrical grinding machine has a machine base which is adjusted a longitudinal slide, on which is mounted an upper table for the angle adjustment. A driven workhead and a tailstock are mounted on the upper table such that they are manually adjustable. The longitudinal slide is mounted on guides and is adjustable. The slide is equipped with a longitudinal slide drive. The guides are aligned parallel to the axis of rotation of the workpiece. Perpendicular to the axis of rotation there are more guides provided on which a cross slide is movable mounted and equipped with a cross slide drive. A driven wheelhead with a grinding wheel is fixed on the cross slide. The machine base is formed in one block and takes up a lot of space. The construction of the machine is complicated.

SUMMARY OF THE INVENTION

It is the object of the enclosed new invention to provide a simple and inexpensive and compact cylindrical grinding machine.

It is a further object of the invention to provide a cylindrical grinding machine which can be loaded from below.

These objects and more according to the invention are provided by a cylindrical grinding machine, having a machine base, a driven workhead to turn a workpiece about a rotation axis, a driven wheelhead to grind the workpiece and a slide drive for relative movement of the workpiece and the wheelhead, wherein the machine base is formed as a fixed plate, on which the workhead, the wheelhead and the slide drive are fixedly attached. Surprisingly it was found when using a plate with a sufficient weight for a machine base instead of the traditional block that the necessary stability is still ensured. This way a great deal of space was saved.

In one embodiment of the invention the plate is adjusted horizontally on a frame. This way additional units as for example cooling filtration unit can be placed space-savingly under the machine base.

In another embodiment of the invention the plate is adjusted vertically. This way even more space can be saved, and additionally a simple loading of the machine from below is possible. Also the cooling of the machine without damage to the machine base is possible. The cylindrical grinding machine according to the invention is therefore very measure-precise, operating- and maintenance-friendly.

In a preferred embodiment of the invention the longitudinal slide drive includes a first electronic control longitudinal slide drive for the workhead and a second electronic control longitudinal slide drive for the tailstock, whereas the first longitudinal slide drive and the second longitudinal slide drive are independently controllable. It is a special advantage of this embodiment that not only all necessary functions are simply done by the independent longitudinal slide drives, like the alteration of the center distance, the clamping of a workpiece, the plunge grinding, the traverse grinding, the grinding of tapers and radius and so on, but also a simple construction is possible: table and upper table as well as the complicated arrangement of the combined slides are unnecessary. In addition the cylindrical grinding machine according to invention is maintenance-friendly, as the longitudinal slide drives can be finished identically for the most part. Also it is especially stabile, because it does not show any complicated adjustment of combined slides. This is especially advantageous when using CBN-grinding wheels and when working on ceramic material.

In another embodiment of the invention, there is provided under the workhead and the tailstock a loading conveyer running in direction of the turning axis. This ensures in a space-saving way an efficient loading and unloading of the workpiece to be worked on.

In another embodiment of the invention, the wheelhead includes a gripper to lift the workpiece from the loading conveyer and to position the workpiece between the workhead and the tailstock. In this arrangement, larger workpieces can be worked on.

In another embodiment of the invention, a lifter is provided for the lifting from the loading conveyer and to hold a workpiece from below and to position the workpiece between the workhead and the tailstock. This has the advantage when clamping the workpiece in the lifter that one makes use of the lifter's weight.

Some embodiments are further provided for in the drawings.

DESCRIPTION OF THE PREFERRED EMBODIMENTS

Figure 1:
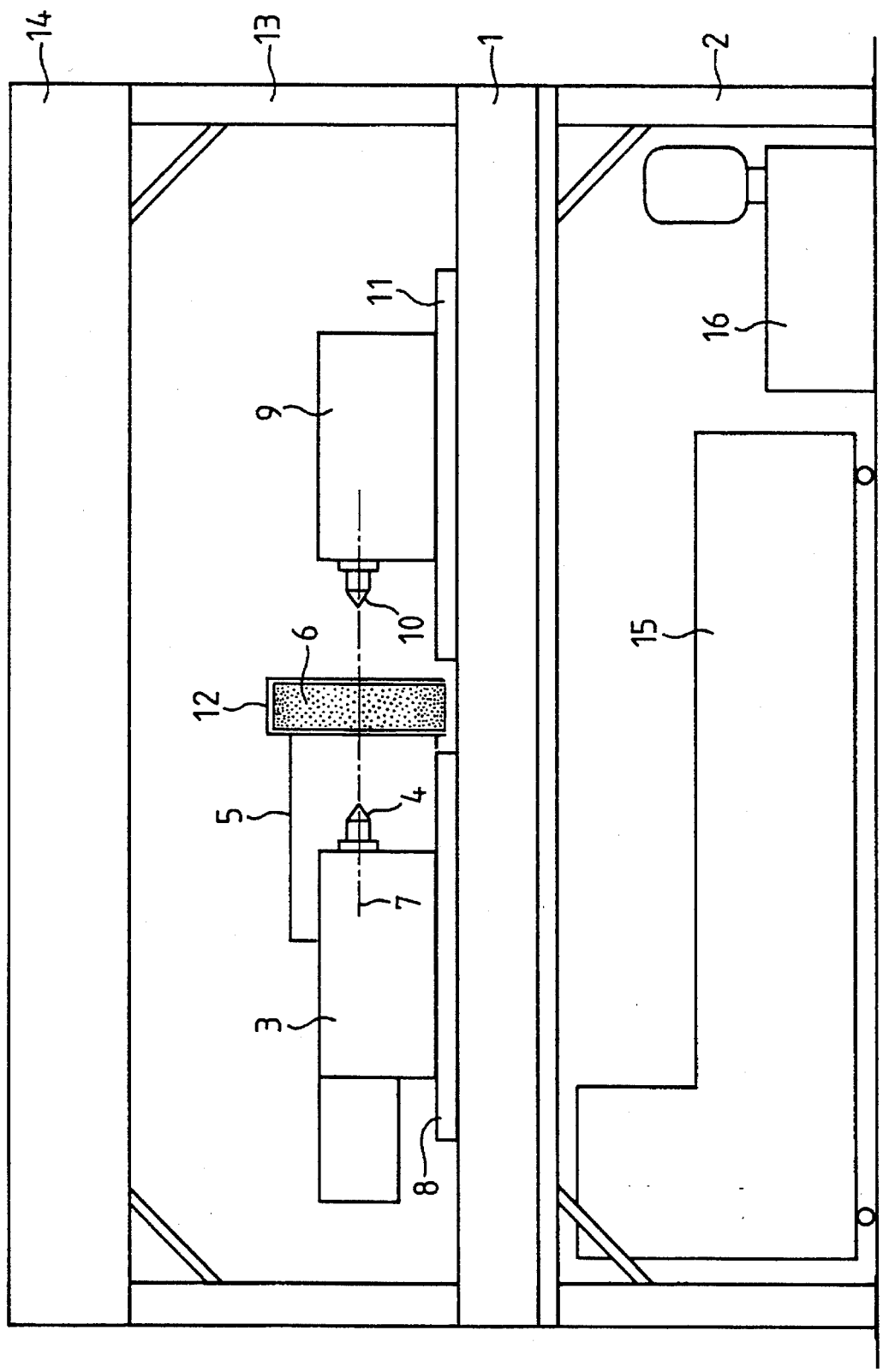
FIG. 1: front view of a cylindrical grinding machine according to invention.

The embodiment of FIG. 1, shows a front view of a cylindrical grinding machine. The machine includes a fixed plate 1 as machine base which is mounted on a frame 2. A workhead 3 in order to hold a workpiece and to turn the workpiece round an axis of rotation 7 is equipped with a driven center 4 and adjusted on a plate 1. A wheelhead 5 to grind the workpiece is also mounted on the plate 1 and equipped with a driven grinding wheel 6 which is surrounded by a protection for the grinding wheel 12. The workhead 3 includes a longitudinal slide drive in order to move the workhead in direction of the axis of rotation 7 over a guide 8. The wheelhead 5 includes a cross slide drive to move the wheelhead perpendicular to the axis of rotation 7. Furthermore, a tailstock 9 with a center 10 is provided to clamp the workpiece. The axis of rotation 7 is the symmetrical axis of the center 10. The center 10 of the tailstock 9 is not driven. The tailstock 9 is equipped with a longitudinal slide drive in order to move the tailstock in direction of the axis of rotation 7 along a guide 11. On the plate 1 is provided another frame 13, on which is mounted a cabinet 14 with control units for controlling the workhead 3, the wheelhead 5, the tailstock 9 and of each its slide drives. The frame 13 can be hollow to provide space for the connection wires between the cabinet 14 and the devices to be controlled. Under the plate 1, a paper band filtration unit 15 and a hydraulic unit 16 are placed.

Figure 2:
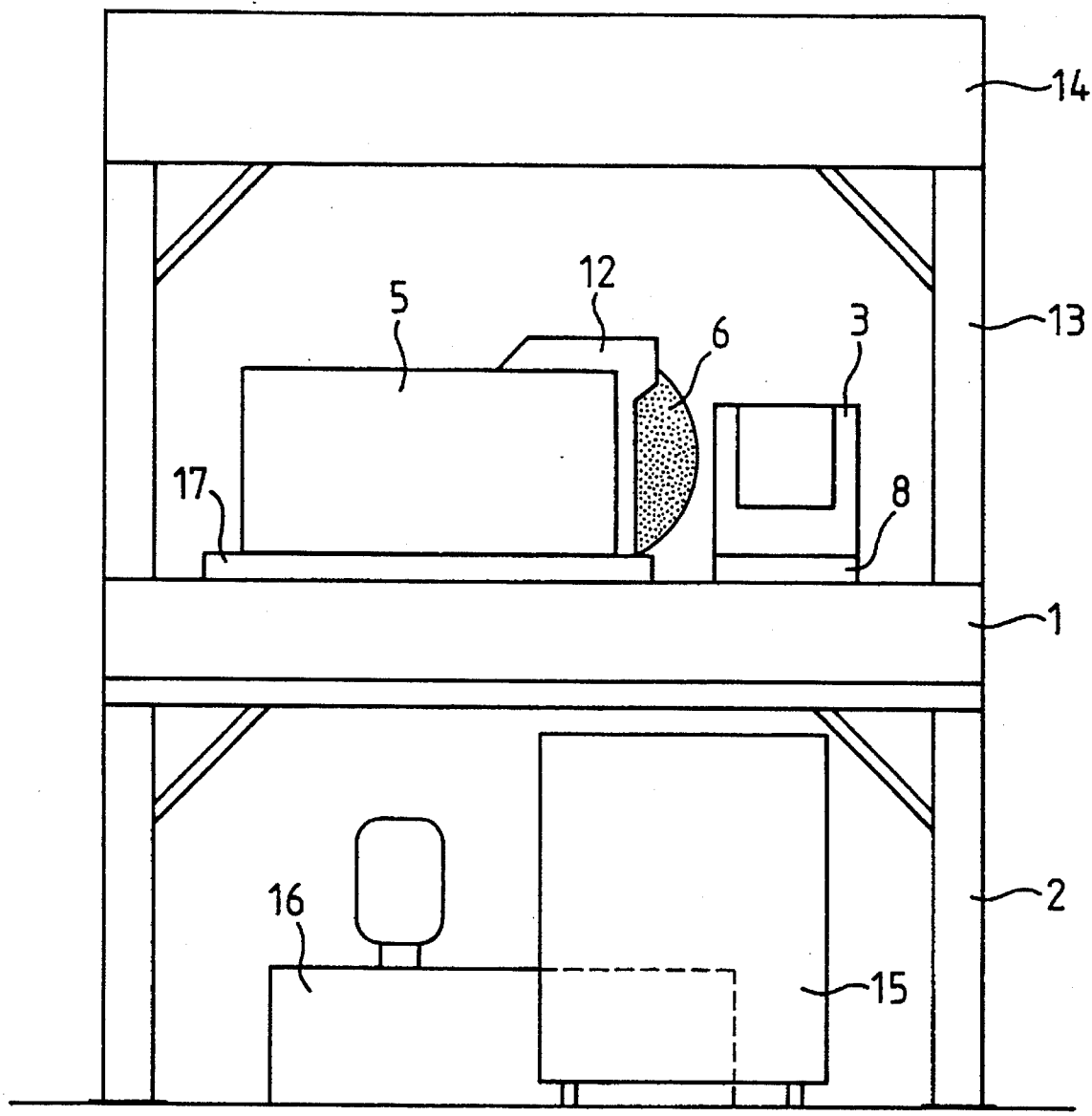
FIG. 2: a side view of the cylindrical grinding machine according to FIG. 1.

FIG. 2 shows a side view of the cylindrical grinding machine shown in FIG. 1. The same reference symbols are used for identical units. The wheelhead 5 can be moved along a guide 17.

The machine base is made of heavy, solid material, for example of granite or of another suitable type of stone, or also of steel, iron, or of another suitable metal. Conventional cylindrical grinding machines have a machine base which is formed of one block. When using a plate with a sufficient weight for a machine base instead of the traditional block, the necessary stability is ensured. This way a great deal of space can be saved. Additional units, for example cooling filtration unit 15 and hydraulic unit 16 can be placed space-savingly under the machine base.

The longitudinal slide drives are independently electronically controllable in order to move the workhead 3 and the tailstock 9 in direction of the rotational axis 7. This way, all necessary functions, such as the adjustment of the center distance, the clamping of the workpiece, the plunge grinding, the traverse grinding, the grinding of tapers and radius and others can easily be accomplished. Conventional cylindrical grinding machines are equipped with a driven longitudinal slide and with an upper table for the angular adjustment, which can be moved in direction of the rotational axis and on which the workhead is fixed as well as the tailstock. All functions of these conventional cylindrical grinding machines with longitudinal slide and upper table are possible for the machine according to invention because of the identical control of the two longitudinal slide drives. The workhead 3 and the tailstock 9 and therefore also the held workpiece follow the same movement. Further functions, like the adjusting of the center distance or the clamping of a workpiece, are simplified by the separate control of the two longitudinal slide drives. Also, the structure is less expensive and simpler in comparison to known cylindrical grinding machines: longitudinal slide and upper table as well as the complicated arrangement of the combined slides are unnecessary. Also, the cylindrical grinding machine according to invention is very maintenance-friendly, because the longitudinal slide drives can be finished identically of each other. Furthermore the machine is especially stabile, because it does not have complicated arrangement of combined slides. This is in particular advantageous when using CBN-wheels and when working on ceramic material. The grinding of tapers and cylinders (radius) takes place by interpolation. Here, the control of the feed motions of the wheelhead 5 on the one hand and the workpiece clamped between the workhead 3 and the tailstock 9 on the other hand are controlled such that the required shape is being grounded. Therefore the angular adjustment is unnecessary and the cylindrical grinding machine does not need an upper table. It is pointed out, even if the independently controllable longitudinal slide drives in connection with the plate-formed machine base are especially advantageous, that they can also be used independently of this.

FIGS. 1 and 2 show a cylindrical grinding machine according to the invention. Here, the wheelhead 5 is equipped with means to grind threads in the workpiece, which result in a thread grinding machine according to the invention.

A cylindrical grinding machine shown in FIGS. 1 and 2 shows an interior grinding machine according to the invention. The workhead 3 is suitable to hold the workpiece. The wheelhead 5 is put in place of the tailstock 9 and has one or several grinding spindles of which the rotational axis for example runs parallel to the rotational axis 7 of the workhead 3. By means of the wheelhead 5 the machine grinds the inside of the workpiece held by the workhead 3.

Figure 3:
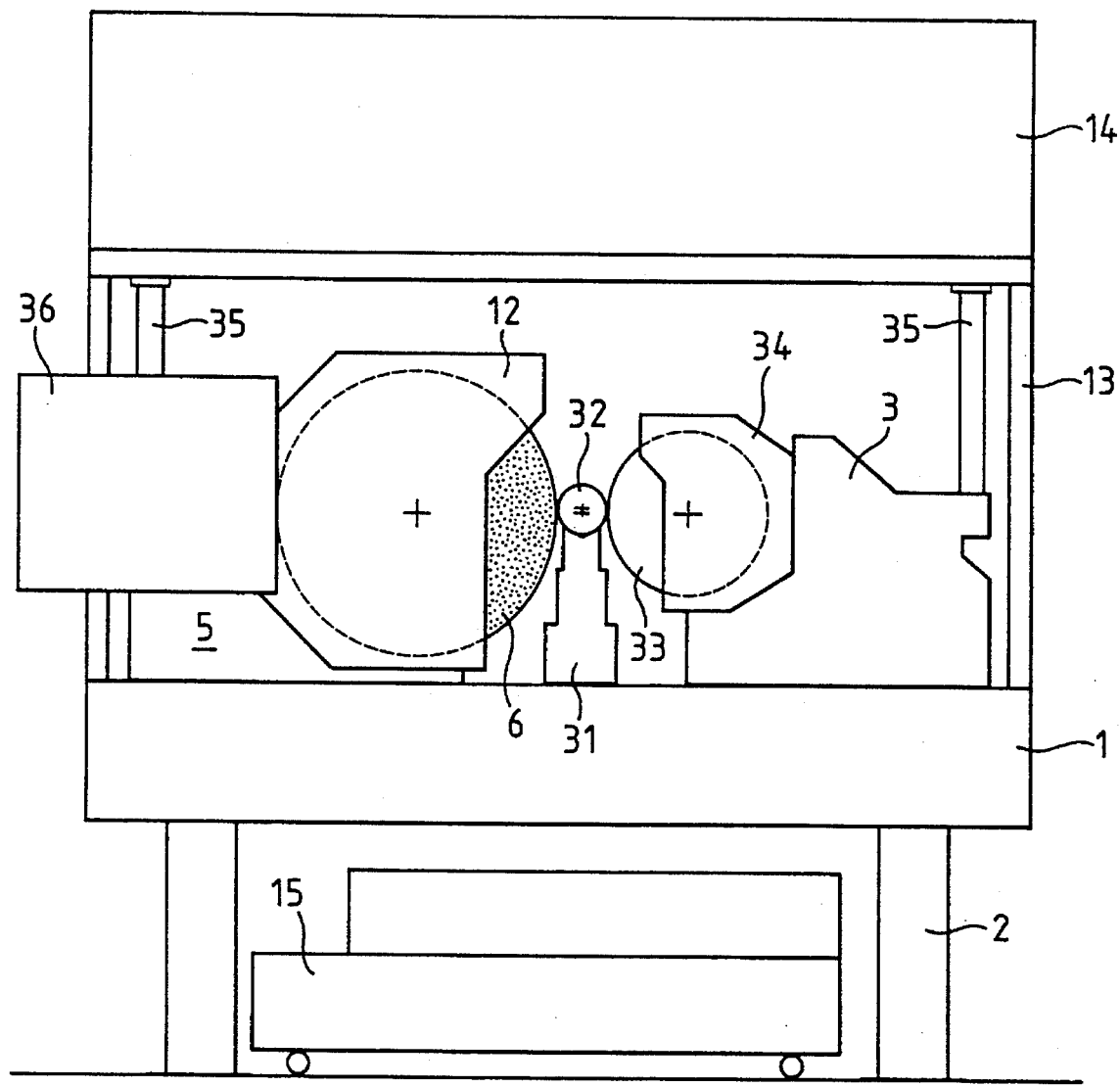
FIG. 3: a front view of a centerless grinding machine.

FIG. 3 shows a front view of a centerless grinding machine according to the invention. A workrest plate 31 is provided to hold a workpiece 32. The workhead 3 is a head of regulating wheel and has a regulating wheel 33, which is put in a splash guard 34. The head of regulating wheel 3 is suitable to turn the workpiece 32, whereas the wheelhead 5 by means of the grinding wheel 6, which one turns much quicker than the head of regulating wheel, processes the workpiece 32. The cabinet 14 with devices to control the workhead 3, the wheelhead 5 and each of its particular slide drive is connected with the devices to be controlled by connection wires 35. The control can for example be made from a screen 36, which is also, in a not shown manner, fixed to the plate 1.

Figure 4:
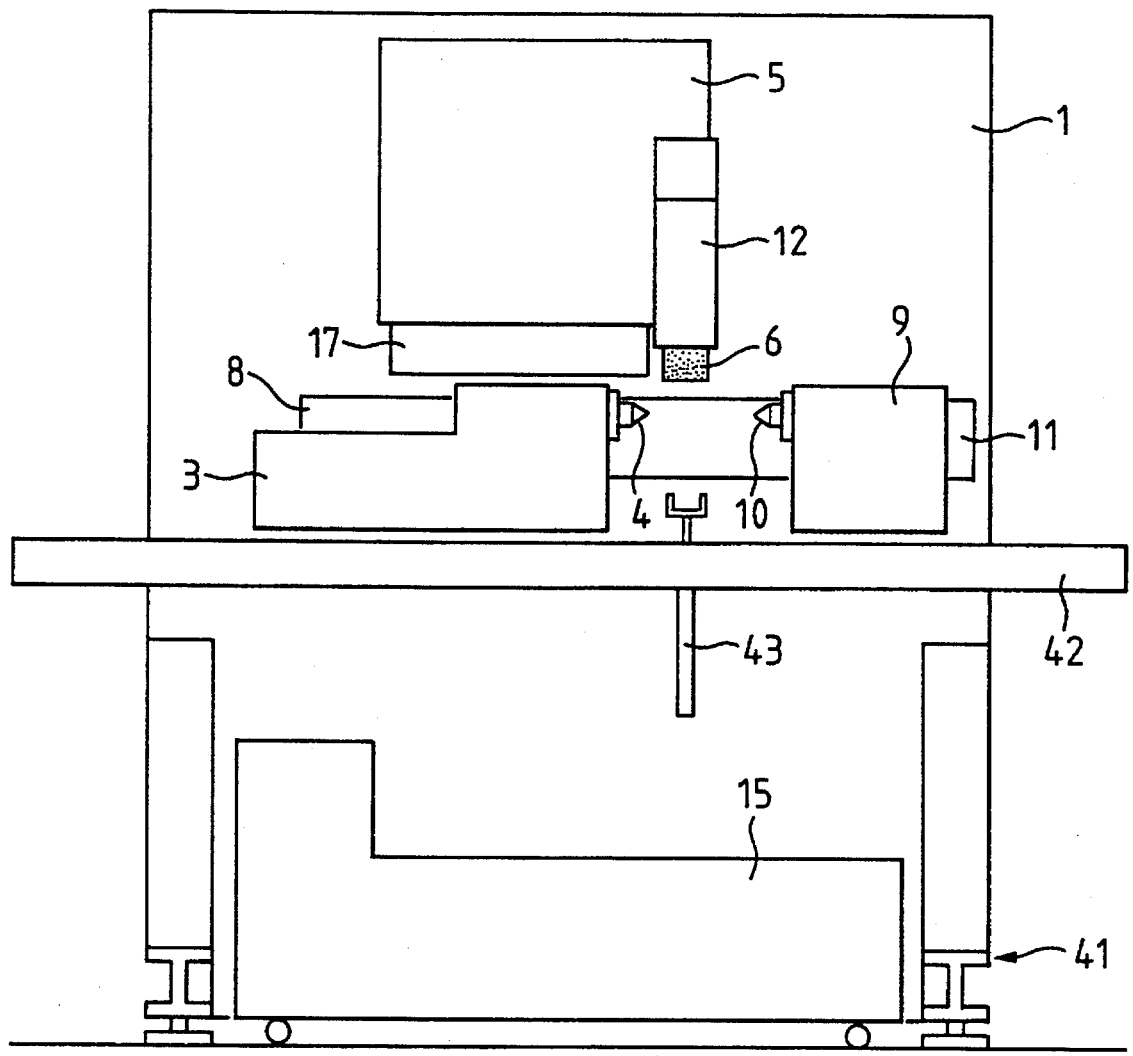
FIG. 4: a front view of another cylindrical grinding machine according to the invention.
Figure 5:
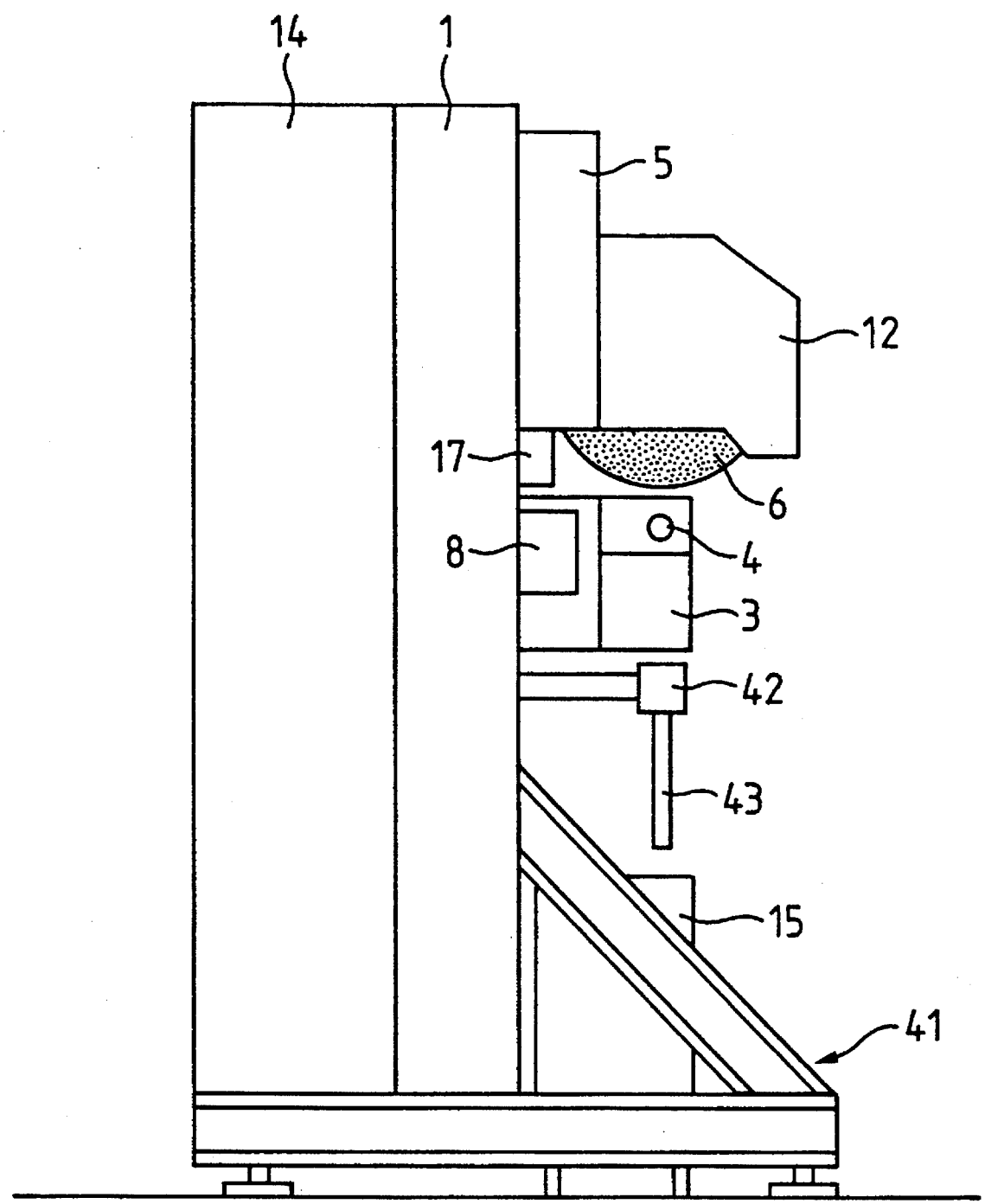
FIG. 5: a side view of the cylindrical grinding machine according to FIG. 4.

FIGS. 4 and 5 show a front view and a side view respectively of another cylindrical grinding machine according to the invention. The machine base is built as a vertical plate 1, so that even more space can be saved. The plate is mounted on a fixture 41. The workhead 3, the wheelhead 5, and the tailstock 9 are adjusted movably with its particular slide drive on the particular guide 8, 17, 11 on the plate 1. The particular slide drives are again independently electronically controllable. Also in this very solid and space-saving implementation form are therefore all the necessary functions ensured. The cabinet 14 with the control devices is mounted behind the plate. The connection wires, not shown, can be taken through the plate 1 and/or around the plate 1. When cooling the cylindrical grinding machine, the coolant drops vertically and does therefore not touch the machine base. Thus, there is no additional heating of the machine base, and the measure-precision of the cylindrical grinding machine is higher. As clarified below a simple loading of the machine from below is as well possible. Therefore, the cylindrical grinding machine according to invention is also very operating-friendly. Under the workhead 3 and the tailstock 9 is located a loading conveyer running along in direction of the rotational axis 7 to ensure an efficient loading and unloading of the workpiece to be processed. The wheelhead 5 can have a gripper to lift the workpiece from the loading conveyer 42 and to position the workpiece between the workhead 3 and the tailstock 9, so that larger workpieces can be processed. In another implementation form a lifter 43 is provided for the lifting from the loading conveyer 42 and to hold a workpiece from below and to position the workpiece between the workhead 3 and the tailstock 9. This way the weight of the lifter 43 is being used when holding the workpiece.

The vertical adjustment according to the invention is applicable for the center grinding machine as well as for the centerless grinding machine, the internal grinding machine and the thread grinding machine.

What is claimed:

1. A cylindrical grinding machine, comprising:

a machine base;

a driven workhead to turn a workpiece about a rotational axis;

a driven wheelhead to grind the workpiece; and at least one slide drive, for providing relative movement of the workpiece and the wheelhead;

the machine base being a fixed heavy solid plate;

the wheelhead comprising a grinding wheel;

said at least one slide drive including a longitudinal slide drive mounting at least one of said workhead and said wheelhead for providing first relative movement of the workpiece and the grinding wheel in the direction of said rotational axis, and a cross slide drive mounting at least one of said workhead and said wheelhead for providing second relative movement of the workpiece and the grinding wheel perpendicularly to said rotational axis; and said longitudinal slide drive and said cross slide drive being mounted separately on said fixed heavy solid plate so as to enable said first and second relative movements to be made independently of one another.

2. The cylindrical grinding machine according to claim 1, wherein the plate is positioned horizontally on a frame.

3. The cylindrical grinding machine according to claim 1, wherein the plate is positioned vertically.

4. The cylindrical grinding machine according to claim 2, wherein under the workhead and the tailstock is located a loading conveyer running in direction of the turning axis.

5. The cylindrical grinding machine according to claim 4, wherein the wheelhead has a gripper to lift a workpiece from the loading conveyer and to position the workpiece between the workhead and the tailstock.

6. The cylindrical grinding machine according to claim 4, wherein a lifter is provided for lifting from the loading conveyer and for holding the workpiece from below and to position the workpiece between the workhead and the tailstock.

7. The cylindrical grinding machine according to claim 1, wherein the cylindrical grinding machine is an interior grinding machine wherein the workhead is suitable to hold the workpiece, and the wheelhead has at least one grinding spindle, having a rotational axis which runs parallel to the axis of rotation of the workhead.

8. The cylindrical grinding machine according to claim 1, wherein the cylindrical grinding machine is a centerless grinding machine with a workrest plate and the workhead is a regulating wheel head and has a regulating wheel.

9. The cylindrical grinding machine according to claim 1, wherein the cylindrical grinding machine is a center grinding machine and a tailstock is provided, which together with the workhead is suitable to hold the workpiece.

10. The cylindrical grinding machine according to claim 9, wherein the center grinding machine is a thread grinding machine.

11. The cylindrical grinding machine according to claim 9, wherein the longitudinal slide drive includes a first electronic control longitudinal slide drive for the workhead and a second electronic control longitudinal slide drive for the tailstock, wherein further the first longitudinal slide drive and the second longitudinal slide drive are independently controllable.

12. The cylindrical grinding machine according to claim 1, wherein the plate consists of granite.

* * * * *